Nov. 28, 1950 J. W. CLERKE 2,531,401
PIPE COUPLING
Filed Sept. 10, 1947
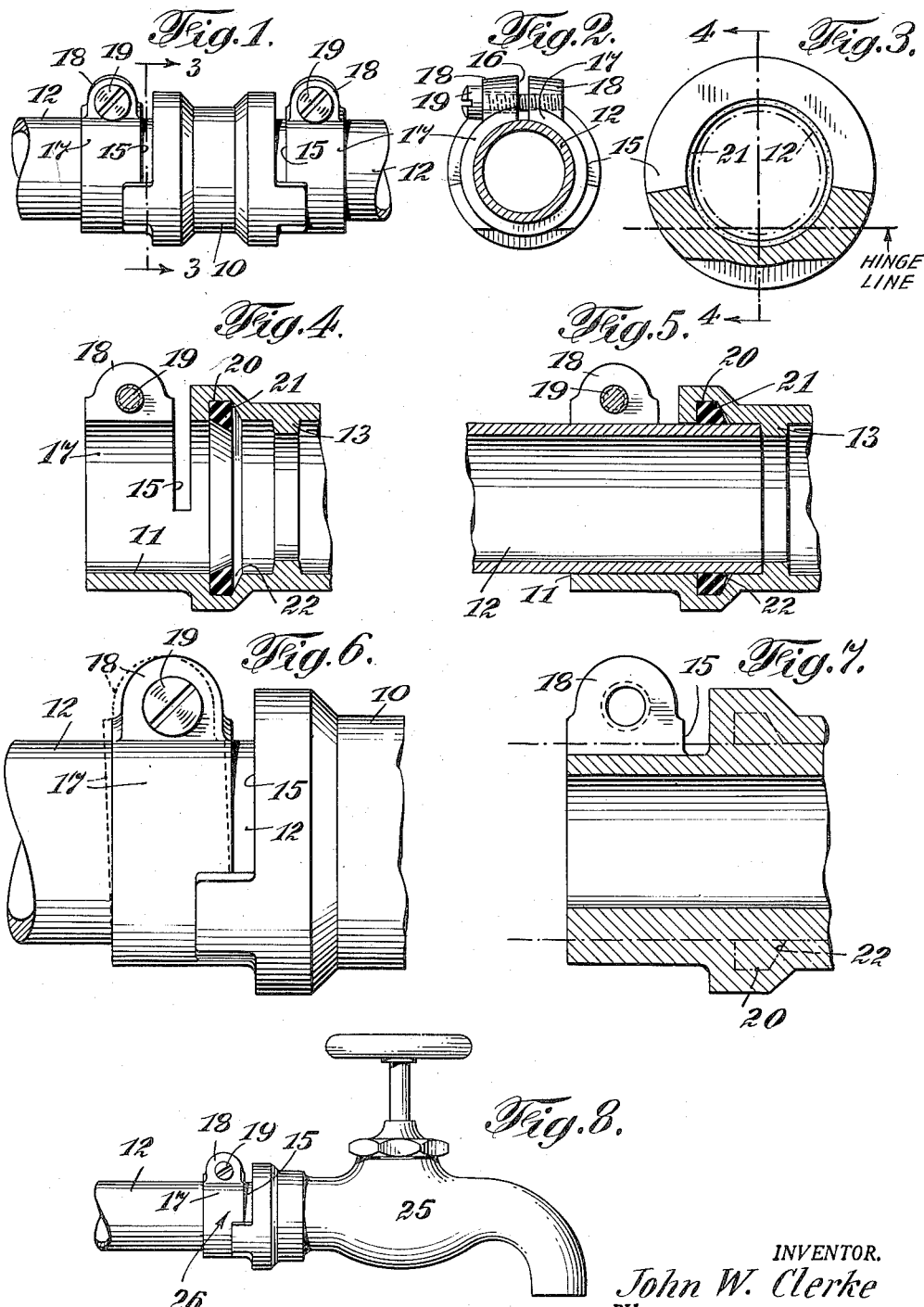
INVENTOR.
John W. Clerke
BY Ridsdale Ellis
his ATTORNEY

Patented Nov. 28, 1950

2,531,401

UNITED STATES PATENT OFFICE 2,531,401

PIPE COUPLING

John W. Clerke, Little Falls, N. J.

Application September 10, 1947, Serial No. 773,158

3 Claims. (Cl. 285—170)

This invention relates to the structure and method of manufacture of pipe couplings designed to connect two pipes together or to connect a faucet, tank nipple, or other fitting or article to a pipe.

It is customary to couple pipes together or to faucets or the like by threading the end of the pipe so that it can be screwed into the pipe union, elbow, faucet, etc. This procedure has several disadvantages. First, the strength of the pipe is determined by its cross-sectional area at the bottom of the threads so that the pipe walls have to be made much thicker than would otherwise be necessary by the height of the threads. Second, as the distance between fittings such as elbows, unions and faucets, varies with the requirements of each installation, the pipe has to be cut to the desired length and then threaded at the place where it is to be installed.

The principal object of the present invention is to provide a coupling which will obviate the necessity for threading the ends of the pipe and be capable of fluid-tight connection to the pipe without the aid of any tools other than a screw driver or wrench, or other tightening means.

Operatively speaking, the coupling comprises two parts; first, clamping means preventing axial separation of the pipe and the coupling, and, second, packing means for preventing escape of water or other liquid or gas. The packing is held in proper position by its inherent elasticity and fluid pressure and not by the clamping means. It is, therefore, not subject to destructive forces so that the coupling may be connected and disconnected almost indefinitely without injury to the packing. Further, the fact that the packing is not between the outer periphery of the pipe and the inner periphery of the clamping means enables metal-to-metal contact to be obtained between the pipe and the coupling. This is important in view of the mode of action of the clamping means.

The clamping means consists of the end section of the coupling which is partially separated from the body of the coupling by a transverse slot and the part so separated is cut axially to form two circumferentially extending tongues which can be drawn together to grip the pipe frictionally. Friction alone is unreliable as a means for holding the pipe in the coupling. Only the end section of the coupling grips the pipe so that the latter is free to slide outwardly with respect to the body of the coupling under fluid pressure. Owing to the friction between the tongues of the end section and the pipe, when the latter moves outwardly it tilts the end section and jams it against the pipe. The gripping action of the clamping means is due principally to this jamming action. The frictional engagement between the pipe and the end section of the coupling enables this jamming action to develop and exert a retaining force far in excess of that obtainable by friction alone. When there is metal-to-metal contact, a very slight tilt of the end section relatively to the body of the coupling produces a very large jamming force.

Two suitable forms of construction are illustrated, by way of example, in the accompanying drawings, wherein:

Fig. 1 is a side elevation of a pipe union embodying the present invention;

Fig. 2 is an end view of the same;

Fig. 3 is a section on the line 3—3 of Fig. 1;

Fig. 4 is a section on the line 4—4 of Fig. 3 prior to the insertion of the pipe;

Fig. 5 is the same section after the pipe has been inserted;

Fig. 6 is a side elevation on an enlarged scale of one half of the coupling illustrating the jamming action of the coupling end;

Fig. 7 is a longitudinal central section through the casting for the union prior to boring; and Fig. 8 is a side elevation of a faucet embodying the present invention.

The particular coupling shown in Figs. 1 to 6, inclusive, is a straight sleeve union. The invention may, however, be embodied in other types of coupling such as elbow, T and Y connections, etc., and also couplings for terminal fittings, such as faucets, as shown in Fig. 8.

The union of Figs. 1 to 6 comprises a sleeve 10 having a bore 11 slightly larger in diameter than the pipe 12 which it is designed to fit. In the bore midway between the ends of the sleeve is an annular inwardly extending projection 13 to limit the distance each pipe end can enter the coupling.

Adjacent each end of the coupling the sleeve is slotted transversely at 15, the slot preferably extending somewhat more than halfway around the sleeve. Another slot 16 divides the severed end of the sleeve into two parts or arcuate tongues 17. These two tongues have outwardly extending lugs 18 which are connected by the clamping screws 19.

Between the projection 13 and the slot 15 is an annular groove 20 for a packing ring 21 of rubber or other impervious elastic material. The normal internal diameter of the ring 21 is less than the external diameter of the pipe 12 so that when the pipe is pushed into the coupling it will expand the ring. The ring will then be held against the pipe by its inherent elasticity as well as by the pressure of the fluid inside the pipe and coupling. To aid the insertion of the pipe, the inner periphery of the ring is conical with its largest diameter, which is larger than the diameter of the pipe, adjacent the end of the coupling. Rubber can be deformed but not compressed. Hence the cross-section of the ring should not be greater than the cross-section of the groove 20. As the pipe is inserted, the inner portion of the ring is pushed outwardly and inwardly into the space 22 provided to receive it, as shown in Fig. 5.

It will be seen that the fluid seal between the coupling and the pipe is independent of any adjustment of the clamping means. Also, as the clamping means does not have to make fluid-tight contact with the pipe, these parts can make metal-to-metal contact. That is important for reasons which will now be explained. When the clamping screws are tightened, the tongues 17 are drawn together into frictional contact with the adjacent part of the pipe. When fluid pressure is applied to the interior of the pipe and coupling, these two parts tend to separate. In view of the frictional contact between the tongues 17 and the pipe, this separating movement draws the tongues away from the body of the coupling. They tilt as a unit, as shown in Fig. 6, about a hinge line located approximately as indicated in Fig. 3. This movement, even though very slight, destroys the alignment between the outside of the pipe and the inner surfaces of the tongues and causes the outer edges of the latter to press more firmly against, if not actually to dig into, the surface of the pipe. The higher the pressure, the greater the movement of the tongues and the greater the consequential jamming action.

Pipe fittings to be commercially practicable have to be cheap and that means manufacture with a minimum number of operations. For that reason the couplings are cast with grooves in their periphery extending sufficiently deeply into the body of the coupling so that, when the casting is bored, the bottoms of the grooves are removed and the grooved become slots. This means that the only machining operations are boring the casting, including cutting the grooves 20 and forming the projection 13 (all of which can be done in one operation), and drilling the lugs 18 and tapping one of each pair.

The faucet fitting of Fig. 8 comprises a faucet section 25 of conventional construction and a coupling section 26 constructed similarly to the left-hand half of the sleeve connector of Figs. 1 to 6.

Couplings made in accordance with this invention are adapted for use with pipes of plastic or other rigid non-metallic material. In fact, the couplings themselves do not have to be made of metal. The term metal-to-metal contact is intended to cover actual contact between the material forming the pipe and that forming the coupling, irrespective of the nature of such material.

I claim:

1. A pipe coupling comprising a sleeve having a bore slightly larger than the outside diameter of the pipe with which it is designed to cooperate, said sleeve having an internal groove extending circumferentially around said bore, a packing ring of elastic impervious material in said groove, said ring having an inner diameter slightly smaller than the outside diameter of the pipe and a cross-section not greater than that of the groove to permit the inwardly projecting part of the ring to be pushed outwardly into said groove by the pipe when the latter is slid into the coupling, the end of the sleeve having two relatively narrow slots, one transverse intermediate said groove and the tip of the sleeve extending more than halfway around the sleeve largely severing such end from the remainder of the sleeve to allow the unsevered portion to act as a hinge for the end of the sleeve thereby allowing the pipe to move outwardly with the largely severed end to produce a jamming action between the pipe and the sleeve and the other extending longitudinally from the tip of the sleeve to said transverse slot to produce two circumferentially extending tongues, the ends of said tongues being closely adjacent to each other, and releasable means for drawing the free ends of the tongues together to contract the largely severed end of the sleeve and press the ends of the tongues against the side of the pipe opposite the unsevered portion of the sleeve with a metal-to-metal contact.

2. A pipe coupling comprising a sleeve having a bore slightly larger than the outside diameter of the pipe with which it is designed to cooperate, said sleeve having an internal groove extending circumferentially around said bore, a packing ring of elastic impervious material in said groove, said ring having an inner diameter slightly smaller than the outside diameter of the pipe and a cross-section not greater than that of the groove to permit the inwardly projecting part of the ring to be pushed outwardly into said groove by the pipe when the latter is slid into the coupling, the end of the sleeve having two relatively narrow slots, one transverse intermediate said groove and the tip of the sleeve extending more than halfway around the sleeve largely severing such end from the remainder of the sleeve to allow the unsevered portion to act as a hinge for the end of the sleeve thereby allowing the pipe to move outwardly with the largely severed end to produce a jamming action between the pipe and the sleeve and the other extending longitudinally from the tip of the sleeve to said transverse slot, and means bridging said longitudinal slot for releasably contracting said end circumferentially to press the portion of said end opposite the unsevered portion of the sleeve against the side of the pipe with a metal-to-metal contact.

3. A pipe coupling comprising a sleeve having a bore slightly larger than the outside diameter of the pipe with which it is designed to cooperate, said sleeve having an internal groove extending circumferentially around said bore, a packing ring of elastic impervious material in said groove, said ring having an inner diameter slightly smaller than the outside diameter of the pipe and a cross-section not greater than that of the groove to permit the inwardly projecting part of the ring to be pushed outwardly into said groove by the pipe when the latter is slid into the coupling, a clamping portion hingedly connected to one side of that part of the sleeve which contains the packing ring, and releasable means for contracting said portion around the pipe to grip the latter with a metal-to-metal contact, whereby when fluid pressure is applied to the interior of the coupling and pipe, the latter moves outwardly and tilts said clamping portion thereby jamming it against the pipe and the pipe against the bore of the sleeve.

JOHN W. CLERKE.

REFERENCES CITED

The following references are of record in the file of this patent:

UNITED STATES PATENTS

| Number | Name | Date |
|---|---|---|
| 1,142,302 | Carlson | June 8, 1915 |
| 1,450,108 | Munslow | Mar. 27, 1923 |
| 1,473,537 | Bailey | Nov. 6, 1923 |
| 2,360,732 | Smith | Oct. 17, 1944 |